United States Patent Office 3,457,618
Patented July 29, 1969

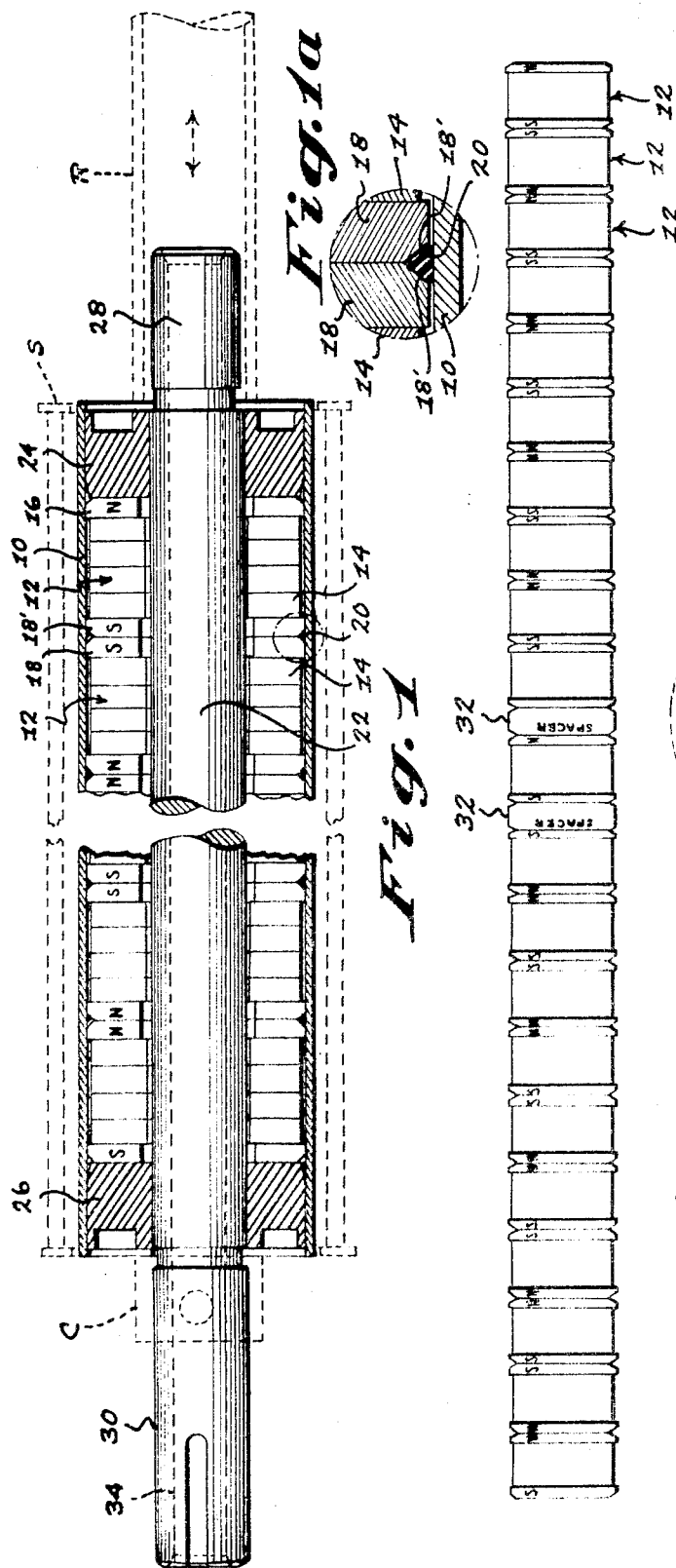

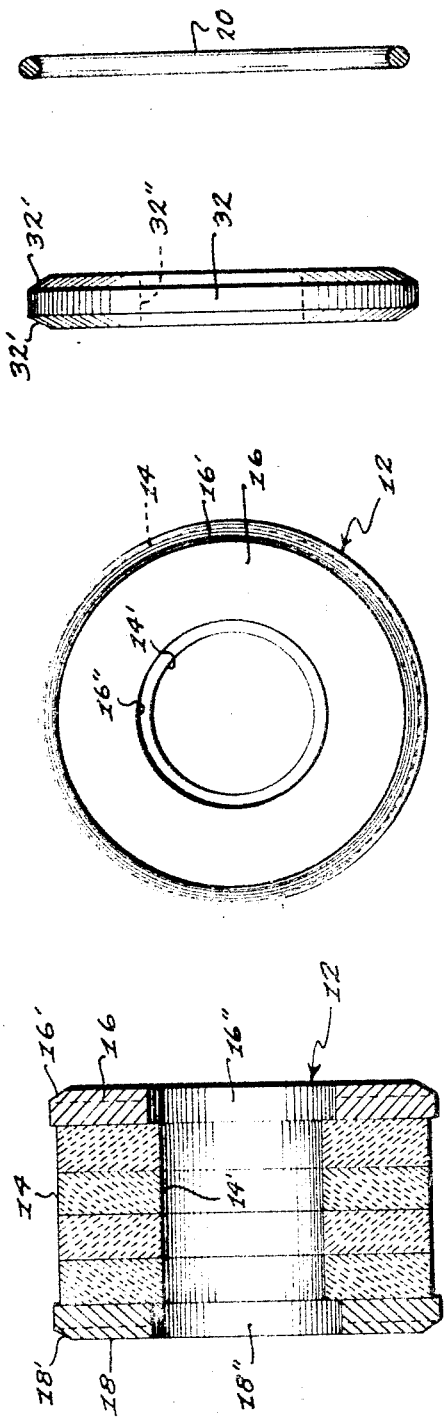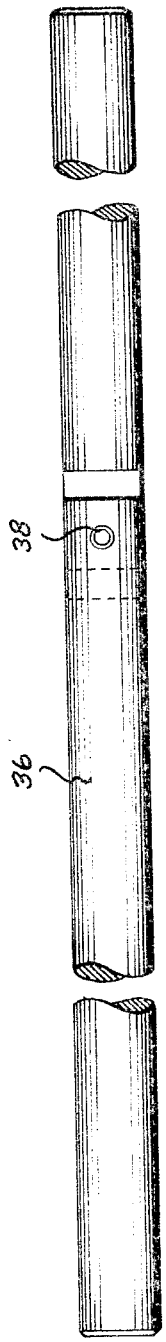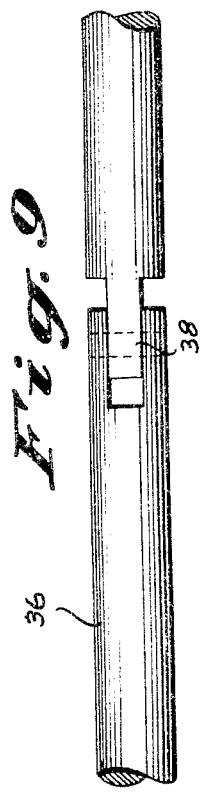

3,457,618
MAGNETIC ROLL STRUCTURE AND METHOD OF FORMING SAME
James Everett O'Neal, Josef Karl Gunter, and Colie Walton Gunter, Durham, N.C., assignors to Gunter & Cooke, Inc., Durham, N.C., a corporation of North Carolina
Filed Jan. 10, 1967, Ser. No. 608,445
Int. Cl. B21h *1/14;* B21d *53/12;* B21k *1/04*
U.S. Cl. 29—125                                   7 Claims

ABSTRACT OF THE DISCLOSURE

A magnetic roll structure in which a plurality of permanent magnet modules are juxtaposed within a tubular shell member and deformable ring members are interposed between the magnet modules so as to be forced into chocking relation at the interior of the shell member to provide for fixing the module plurality as a rigid assembly within said shell member. The roll structure also incorporates an axial shaft of non-magnetic material formed to house an optional shunt bar for lessening the exterior field strength of the magnet modules when desired.

CROSS-REFERENCES TO RELATED APPLICATIONS

This application discloses an improved form of the magnetic roll structure disclosed and claimed in copending application Ser. No. 487,764, filed Sept. 16, 1965, now Patent No. 3,364,545.

BACKGROUND OF INVENTION

As in the case of the previously noted copending application Ser. No. 487,764, the present invention is concerned with roll members incorporating magnet means for exerting a magnetic influence at the surface thereof, and has special signficance for use as the magnetic member of a carding machine crush roll arrangement such as is disclosed by copending application. Ser. No. 401,274, filed Oct. 2, 1964.

The invention makes it possible to assemble the roll structure readily in a manner that fixes modules forming the magnet means rigidly in place so that they are held securely against any tendency to shift during rotation of the roll structure and are thereby stabilized to much improved advantage for tolerating relatively high speed rotation, such as is contemplated in the course of use for crush roll purposes of the sort described by application Ser. No. 401,274 mentioned above.

SUMMARY OF THE INVENTION

The magnetic roll structure of the present invention comprises a tubular shell member housing a plurality of permanent magnet modules juxtaposed therein. The magnet modules each incorporate circular pole pieces that are proportioned for an easy sliding fit within the tubular shell, and that each have the outer side face thereof relieved or beveled adjacent its circumference so that the juxtaposed magnet modules form an annular space of triangular cross section between adjacent pole pieces at the inner surface of the shell member. At each of the annular spaces thus formed, a deformable ring member is arranged to chock the magnet modules in place. These ring members, suitably O-ring elements of neoprene or the like, have a normal circular cross section corresponding substantially in area with that of the annular space cross section, so as to be deformed triangularly within the annular spaces upon juxtaposing of the magnet modules to grip the inner surface of the tubular shell and thereby provide the chocking effect. When fixed within the tubular shell member in this manner an exceptionally secure assembly of the magnet modules is obtained.

The shell member is preferably formed of non-magnetic material as disclosed in the related copending application Ser. No. 487,764, and the assembly is effected according to the present invention by placing the shell member lengthwise adjacent a coextensive structure of magnetic material to hold the magnet modules in place temporarily as they are inserted successively in preparation for fixing the assembled plurality within the shell member.

The completed roll structure assembly further incorporates end pieces disposed within the shell member for fixing the magnet modules in place, and for mounting an axial shaft member which presents journal portions beyond each end of the shell member and extends therethrough at axial clearance bores provided in the magnet modules. The end pieces and shaft member are also preferably formed of non-magnetic material, and the shaft member with axial bore at which a shunt bar may be optionally disposed as is described in further detail below.

DESCRIPTION OF THE DRAWINGS

FIG. 1 is a longitudinal section of a representative magnet roll structure embodying the present invention;
FIG. 1a is an enlarged sectional detail of the circled portion in FIG. 1;
FIG. 2 is a schematic representation of magnet module arrangement employed in the FIG. 1 roll structure;
FIG. 3 is a right end elevation corresponding to FIG. 1;
FIG. 4 is a sectional detail of a magnet module;
FIG. 5 is a right end elevation corresponding to FIG. 4;
FIG. 6 is a side elevation of a spacer member suitable for use with the magnet module assembly;
FIG. 7 is sectional side elevation of a deformable ring member such as is used for chocking the magnet modules;
FIG. 8 is a side elevation of a shunt bar suitable for optional use according to the present invention; and
FIG. 9 is a fragmentary plan detail corresponding to FIG. 8.

DESCRIPTION OF THE PREFERRED EMBODIMENT

Referring first to FIG. 1 of the drawings, the illustrated roll structure embodying the present invention is seen to comprise the previously mentioned tubular shell member 10 housing magnet modules 12 that are preferably formed of several sintered ferrite magnet wafers 14 assembled between a pair of pole pieces 16 and 18 (see FIG. 4), and that are arranged in bucking relation within the shell member 10. Both the tubular shell 10 and the magnet modules 12 are preferred in the form disclosed in detail by the related application Ser. No. 487,764; the tubular shell 10 being formed of hard surfaced non-magnetic material, and the magnet modules 12 corresponding to those of the related application except for beveling of the pole pieces 16 and 18 at their outer side faces adjacent their circumferences as indicated at 16′ and 18′. The degree of beveling is suitably 38° with respect to the plane of the outer side faces.

The result of this pole piece beveling at 16′ and 18′ is an annular space of triangular cross section at the inner surface of the tubular shell member 10 between the magnet modules 12 housed therein, and each such annular space is occupied according to the present invention by a deformable ring member 20 for chocking the assembled modules 12 in place as illustrated best in FIG. 1a. The ring members 20 have a normal cross section that is circular in shape, as seen in FIG. 7, and they suitably consist of O-ring elements formed of neoprene or other resilient material. Additionally, the circular cross section of the ring elements 20 is proportioned to have an area corresponding substantially to that of the triangular cross section given by the pole piece beveling 16' and 18' to the annular space formed thereby between.

The chocking effect of the ring members 20 is obtained from the deformation that is imposed on them by confinement between the assembled modules 12. FIG. 1a illustrates the assembled condition at a representative annular space, the illustrated ring member 20 having been forced to assume substantially the triangular cross section of the annular space, and having consequently been caused to grip the inner surface of the tubular shell member 10. Because the normal circular cross section of the ring members 20 cannot, as a practical matter, be forced into full conformity with the triangular shape of the annular spaces, but will retain some rounding at the corners of its imposed triangular shape, the assembly deformation will involve some compression of the resilient ring members to force the gripping within the shell member 10. Accordingly, the pole pieces 16 and 18 may be proportioned for an easy sliding fit within the shell member 10 to facilitate their assembly insertion, while depending on the interposed ring members 20 to chock them securely in place upon assembly.

The magnet wafers 14 and pole pieces 16 and 18 are also formed with axial bores 14', and 16'' and 18'' (see FIG. 4) to clear an axial shaft member 22 that is mounted within the tubular shell 10 in end pieces 24 and 26 and extends therethrough to present journal portions 28 and 30 at each end of the roll structure as shown in FIG. 1.

Assembly of the FIG. 1 roll structure is accomplished to the best advantage by first arranging separately the plural series of magnet modules 12 that are to be used in the roll structure. FIG. 2 diagrams such an arrangement for a crush roll intended for use on a 40'' card, the module series having a composite length of about 39'' and including two spacer elements 32 arranged in relation to the longitudinal center of the series. The spacer elements 32 have a form, such as is illustrated further in FIG. 6, that incorporates beveling at 32' in correspondence with the module pole pieces 16 and 18, and an axial clearance bore 32'' for the shaft member 22. These spacers 32, however, are formed of a non-magnetic material such as aluminum, and are employed for evening the attractive effect of the magnetic roll structure from end to end. The number of spacer elements 32 employed may be varied in relation to the length of module series as needed for the desired evening effect.

Having arranged the magnet module series that is to be employed as in FIG. 2, the tubular shell member 10 is then placed in lengthwise adjacent relation to a coextensive magnetic structure, suitably a cage of cold rolled steel rods as indicated in dotted lines at S in FIGS. 1 and 3. With the shell member 10 thus disposed the axial shift member 22 is extended therethrough with one end piece 26 located by a clamping collar C (see FIG. 1) temporarily fixed on the adjacent shaft journal 30 in backing relation, and a reciprocating ram means R (see FIG. 1) is employed to insert the magnet modules 12 successively, while interposing the deformable ring members 20 and placing the spacer elements 32 in their turn.

The adjacent magnetic cage structure S is employed during this operation to maintain the inserted magnetic modules 12 in place against their bucking relation until insertion of the full series has been completed. A mold release spray material is advantageously employed within the shell member 10 to ease the placing of the ring members 20 between the modules 12. After the full module series has been inserted, the remaining end piece 28 is put in place and the ram means R is employed to press the inserted series to the extent needed for juxtaposing the modules 12 so as to deform the interposed ring members 20 to their chocking condition. The ram pressure needed for this purpose is then held while the end pieces 24 and 26 are welded to the shell member 10 and shaft 22 to complete the assembly, whereupon the ram means R, temporary clamping collar C and adjacent cage structure S may be removed to leave the finished magnetic roll.

It should be noted finally that, as the finished magnetic roll structure embodies a fixed assembly of the magnet modules 12 therein, the axial shaft member 22 is formed with an axial bore throughout its length, as indicated at 34 in FIG. 1, to provide for optional disposition of a shunt bar member 36 therein for lessening the attractive strength of the magnetic roll structure when desired. This shunt bar member 36 may be a simple rod of cold rolled steel, although for use with a carding crush roll it is preferably formed, as illustrated in FIGS. 8 and 9 with a knuckle joint 38 intermediate its length so that it may be inserted and removed readily without requiring undue manipulating space beyond the ends of the roll shaft.

This invention has been described in detail above for purposes of illustration only and is not intended to be limited by this description or otherwise except as defined in the appended claims.

We claim:

1. A magnetic roll structure comprising a tubular shell member, a plurality of permanent magnet modules juxtaposed within said shell member, each of said magnet modules incorporating circular pole pieces, each of said pole pieces being circularly proportioned for an easy sliding fit within said tubular shell member and having the outer side face thereof relieved adjacent its circumference so that said juxtaposed magnet modules form an annular space at the inner surface of said shell member between the relieved portions of the respective pole pieces thereof that are adjacent, and a deformable ring member disposed at each such annular space and confined therein so as to be deformed in cross section and thereby chock said magnet modules rigidly within said tubular shell, the magnet modules being juxtaposed in bucking relation throughout substantially the entire axial extent of said tubular shell member except for at least one spacer member interposed in relation to the longitudinal center of said shell member for evening the attractive effect of said magnetic roll structure from end to end, and said spacer member having the outer faces thereof relieved adjacent its circumference in mating correspondence with said pole pieces.

2. A magnetic roll structure as defined in claim 1 and further characterized in that the outer side faces of said pole pieces are relieved on a bevel so that the annular spaces formed thereby within said shell member have a triangular cross section, and in that said deformable ring members have a normally circular cross section corresponding substantially in area with the triangular cross section of said annular spaces.

3. A magnetic roll structure comprising a tubular shell member, a plurality of permanent magnet modules juxtaposed within said shell member, each of said magnet modules incorporating circular pole pieces, each of said pole pieces being circularly proportioned for an easy sliding fit within said tubular shell member and having the outer side face thereof relieved adjacent its circumference so that said juxtaposed magnet modules form an annular space at the inner surface of said shell member between the relieved portions of the respective pole pieces thereof that are adjacent, and a deformable ring member disposed at each such annular space and confined therein so as to be deformed in cross section and thereby chock said magnet modules rigidly within said tubular shell, said magnet modules being formed with axial bores, a shaft for said roll structure being mounted within said shell member and extending through said axial bores and presenting journal portions beyond each end of said shell member, said shaft being formed with an axial bore throughout its length, and a shunt bar member being removably disposed in sliding relation within said axial shaft bore.

4. A magnetic roll structure as defined in claim 3 and further characterized in that said shunt bar is formed with a knuckle joint intermediate its length.

5. A magnetic roll structure as defined in claim 3 and further characterized in that said shell member and said shaft and mounting therefor are formed of non-magnetic materials.

6. The method of assembling a magnetic roll structure in which a tubular shell member of non-magnetic material encloses a plurality of permanent magnet modules juxtaposed in bucking relation therein, which method comprises placing said shell member lengthwise adjacent a coextensive structure of magnetic material, inserting the magnet modules of said plurality successively within said shell member while employing said adjacent structure to maintain the inserted modules in place until the full plurality has been inserted, then fixing the inserted plurality of modules within said shell member, and finally removing said adjacent structure.

7. The method defined in claim 6 and further characterized in that the magnetic roll structure being assembled has deformable ring members interposed between the magnet modules of said plurality, and in that the inserting step of said method is accomplished by ramming said modules successively into place with said ring members interposed so that in juxtaposing said modules the interposed ring members are deformed into chocking relation at the interior of said shell member before said module plurality is fixed therein.

References Cited

UNITED STATES PATENTS

| | | |
|---|---|---|
| 1,685,498 | 9/1928 | McCullough. |
| 2,494,598 | 1/1950 | Waring. |
| 3,165,210 | 1/1965 | Mojden et al. |
| 3,364,545 | 1/1968 | O'Neal et al. _____ 29—132 X |

BILLY J. WILHITE, Primary Examiner

U.S. Cl. X.R.

29—132, 148.4